(No Model.)
J. A. JOHNSON.
METALLIC WHEEL.
No. 407,596. Patented July 23, 1889.
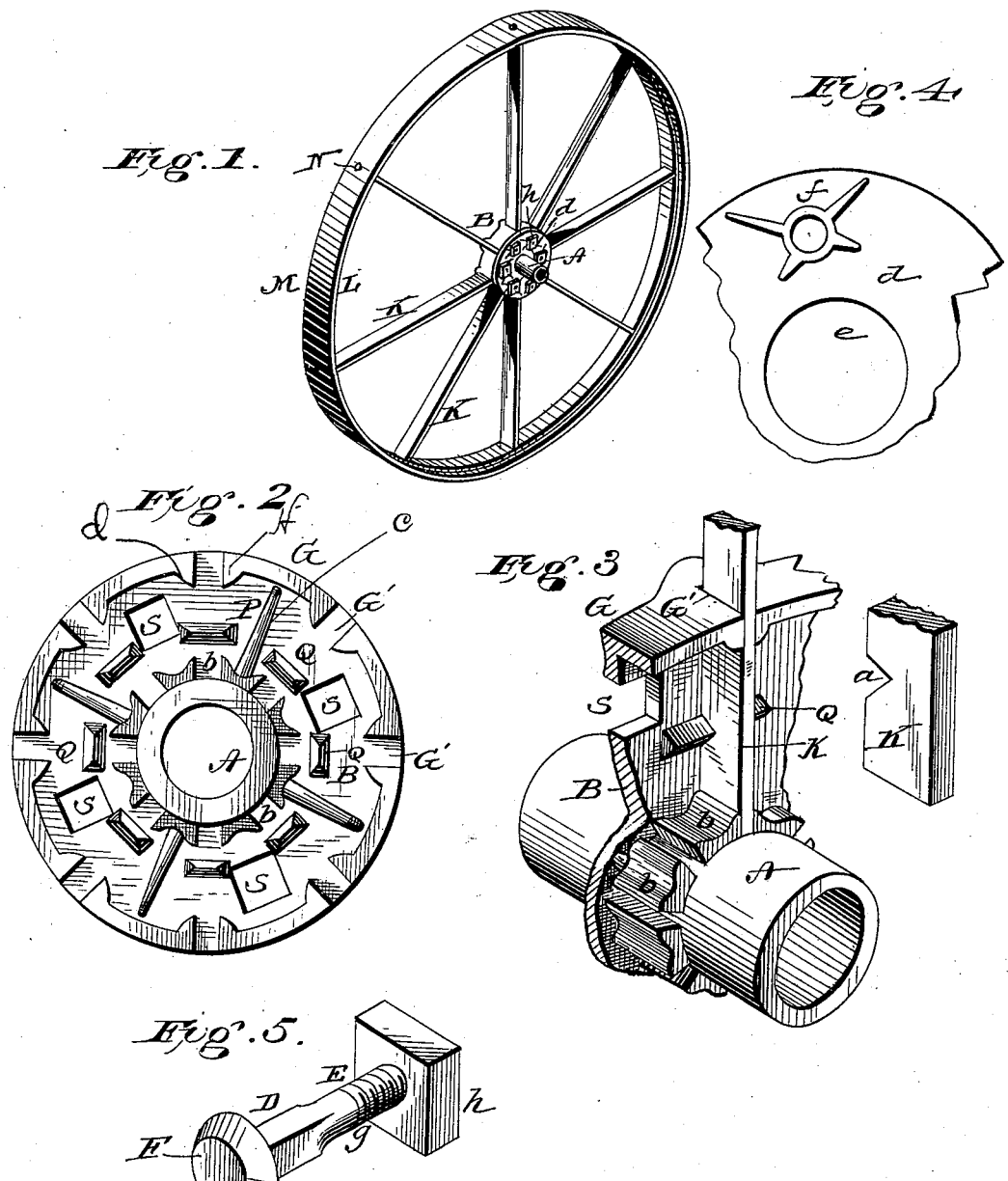
WITNESSES
F. L. Durand
G. Agur Wooster
INVENTOR
John A. Johnson,
by Louis Bagger & Co.,
Attorneys.

UNITED STATES PATENT OFFICE.

JOHN A. JOHNSON, OF MADISON, WISCONSIN.

METALLIC WHEEL.

SPECIFICATION forming part of Letters Patent No. 407,596, dated July 23, 1889.

Application filed April 24, 1889. Serial No. 308,399. (No model.)

*To all whom it may concern:*

Be it known that I, JOHN A. JOHNSON, a citizen of the United States, and a resident of Madison, in the county of Dane and State of Wisconsin, have invented certain new and useful Improvements in Cultivator-Wheels; and I do hereby declare that the following is a full, clear, and exact description of the invention, which will enable others skilled in the art to which it appertains to make and use the same.

My invention relates to cultivator-wheels, and wheels for other agricultural implements where wheels of the class hereinafter described may or can be used; and the invention consists in the construction and novel combination of parts, as will be hereinafter fully described, and particularly pointed out in the claims.

Figure 1 of the drawings is a view in perspective of a vehicle-wheel of the class named embodying my improvements. Fig. 2 is a view of a portion of the wheel, showing the interior construction of the hub and the peculiarly-constructed internal sleeve of the hub. Fig. 3 is a detail view showing the inner end of the spoke notched and the interior projection or integral spur or sectional flange which fits into the notch in the edge of the spoke and prevents the accidental withdrawal or displacement of the spoke from the hub. Fig. 4 is an inside face view of the movable cap or head of the hub, and Fig. 5 is a view in perspective of one of the securing-bolts and its fastening-nut.

Like letters of reference denote corresponding parts in all the figures.

Referring by letter to the accompanying drawings, A designates the axle-sleeve, which is tubular in cross-section, and is made sufficiently long to receive the axle of the running-gear of which the wheel forms a part.

One head B of the hub of the vehicle-wheel is made integral with the axle-sleeve A, the whole hub and sleeve being made of cast or malleable iron, and the head B is made with radially-disposed rectangular bolt seats or openings S for the rectangular portions D of the headed and threaded bolts E, the rectangular portions of said bolts being seated in said rectangular openings or seats S, and the heads F of said bolts E having their flat inner faces bearing against the face of the head B. The peripheral flange G of the head B is made integral with said head B, and extends inwardly parallel with the axle-sleeve A, and is provided with radially-disposed rectangular elongated openings G', having inwardly-projecting flanges H I along their sides, which projecting flanges form bearing-surfaces for the sides of the spokes K, the outer ends of which enter seats in the felly L of the wheel and are upset therein, so as to be permanently attached or connected at these points, a tire M being also secured to the felly by rivets N, so that this portion of the wheel may have great strength while still possessing great lightness.

The inner face of the head B of the hub is provided with radially-disposed integral ribs P, which terminate at their inner ends in spurs Q, which are of triangular shape in outline and enter correspondingly-shaped recesses or notches $a$ in the spokes K in their outer edges, or those edges which bear against the head B of the hub, to secure the spokes between the integral radially-disposed projecting bearings $b$, cast on the periphery of the axle-sleeve A. Alternate bearings $b$ of the axle-sleeve A are provided with radial ribs $c$, cast integral with the head B and with said bearing $b$, in order to give the necessary strength to the head of the hub.

The removable cap or head portion $d$ of the hub is provided with a central opening $e$ for the passage of the axle-sleeve A when putting said cap to place, and is provided with re-enforced bolt-opening $f$ for the passage of the threaded portions $g$ of the securing-bolts E, which latter pass through said openings $f$ after the inner ends of the spokes have been pushed into or sprung to place, and the fastening or securing nuts $h$ are then turned tightly home and firmly secure the parts together, so that the spokes and cap are held securely in place.

Although I have described the spurs or projections on the stationary head of the hub and the notches in the edges of the spokes nearest to said head, it is obvious that the removable cap may be provided with said projections, and that the notches, when used, may be made in the edges of the spokes next to said removable cap, without departing from the character of the invention, as the spokes will be firmly held within the hub in either event, and the latter construction will be, mechanically speaking, practically the same as the former, except that the weight of the material of the hub will be more evenly distributed throughout the hub structure.

The inwardly-projecting flanges H I of the openings G may be bent or hammered inwardly upon or against the spokes to prevent them working loose or jarring in the hub.

Having thus fully described my invention, what I claim as new, and desire to secure by Letters Patent, is—

1. In a vehicle-wheel of the class described, the combination, with the axle-sleeve having the integral cast malleable head provided with an integral peripheral flange having flanged openings for the reception of the metal spoke, of the integral radial bearings on the axle-sleeve, the metallic spokes secured in the felly and tire, and the removable head or cap and the securing bolts and nuts, substantially as specified.

2. The combination, with the axle-sleeve having the integral radial bearings with seats between them, of the integral head provided with the recessed peripheral flange having the inwardly-projecting bearings along the longer sides of the recesses of said peripheral flange, the felly and tire connected by metal spokes having notches near their inner ends, the removable cap, and the securing bolts and nuts for locking the spokes within the hub, substantially as specified.

3. The combination, with the axle-sleeve and the metallic head having the peripheral flange provided with recesses having inwardly-projecting side flanges bent inwardly against the spokes, of the removable cap and the bolts and nuts for securing the parts together, substantially as specified.

In testimony that I claim the foregoing as my own I have hereunto affixed my signature in presence of two witnesses.

JOHN A. JOHNSON.

Witnesses:
A. E. PROUDFIT,
J. H. NICHOLS.